Patented Aug. 8, 1933

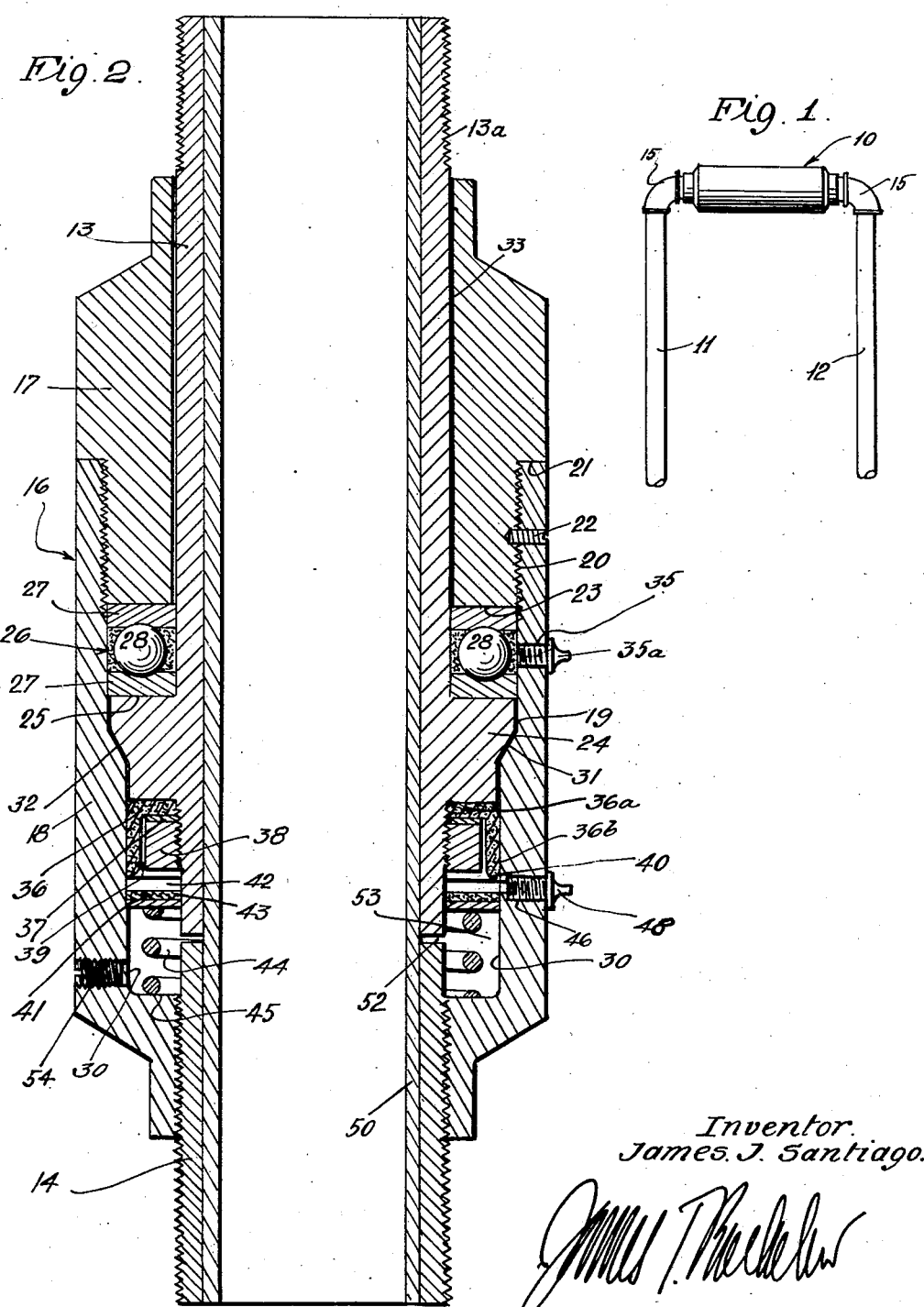

1,921,136

UNITED STATES PATENT OFFICE 1,921,136

SWIVEL JOINT

James J. Santiago, Los Angeles, Calif., assignor to John Grant, Los Angeles, Calif.

Application March 24, 1931. Serial No. 524,777

10 Claims. (Cl. 285—96)

This invention relates generally to improvements in pressure fluid conduits, such as for example rotary hose for conducting circulating fluid or mud in well drilling operations. While I have chosen to described my invention as embodied in rotary hose, it is to be understood that in certain of its aspects, particularly as regards the swivel joint construction, the invention is not to be impliedly regarded as being applicable only to rotary hose. Instead, such features of the invention will be readily recognized as being adaptable to a wide variety of uses of this general character.

In accordance with the present invention I provide a fluid pressure actuated type of packing which keeps the joint parts sealed against leakage, and also provide means independent of the line fluid pressure, whereby the packing is continuously maintained in expanded fluid tight condition. This is accomplished preferably by maintaining a closed body of lubricant in contact with the packing, and in providing means whereby the lubricant in contact with the packing is at all times maintained under a pressure which acts on the packing to seal the joint against leakage between its parts. Thus, as stated, the advantage gained is that the packing is continuously maintained in expanded condition, and by means independent of the pressure of the fluid being carried through the joint.

Another object of the invention, and one more particularly dealing with rotary hose, is to prolong the useful life of rotary hose by reducing the wearing action thereon by abrasive particles carried in the circulating fluid. As is commonly known in the art, the circulating fluid usually is pumped through the rotary hose at considerable pressure and velocity, and as a result abrasive particles in the fluid have a tendency to cut and wear away the inner wall of the hose. This difficulty is obviated in accordance with the invention by the provision in rotary hose, of a removable wear taking tubular liner. Preferably the liner will be made of suitable flexible material, and will be inexpensive as compared with the outer pipe or the pressure resisting casing inclosing the liner. Due to the fact that the entire abrasive wear is on the liner and the casing is kept substantially free from internal wear, the liners may be removed periodically if they become worn and the outer casing used for an indefinite time.

The above objects, as well as numerous additional features and details of the invention will be readily understood without further preliminary discussion from the following detailed description of a typical and preferred form of the invention. Reference is had for purposes of description to the accompanying drawing, in which:

Fig. 1 is a general elevational view illustrating my improved swivel joint as a connection between the sections of rotary pipe hose; and Fig. 2 is a medial sectional view taken longitudinally through the joint.

As a typical example of its various uses, the swivel joint, generally indicated at 10, is shown in Fig. 1 to be employed as a swivel connection between sections 11 and 12 of a rotary pipe hose. Pipe sections 11 and 12 are joined to the swivelly-connected pipe sections 13 and 14 of the joint 10, by way of elbow fittings 15. As will readily be seen, the swivel joint permits relative swinging of the pipes 11 and 12 in planes normal to the axial or longitudinal center line of the swivel joint. I may state that the usual pipe swivel hose is made up of two or more swivelly connected sections such as 11 and 12, one end of the hose having connection with the mud pump, and the other being swivelly connected with the head at the upper end of the kelly or drill pipe. It will be unnecessary for purposes of description herein to show such connections with the rotary hose, since the application or use of the hose in rotary well drilling operations will be readily understood by those familiar with the art.

Referring now to Fig. 2, the joint is shown to comprise a body, generally indicated at 16, which is so formed as to provide an interior annular bearing shoulder opposing an annular bearing shoulder on the swivel pipe section 13 of the joint. Although the body may be so formed in a variety of manners, I have shown it typically and preferably as comprising two sections 17 and 18. Into the end of the body section 18 is threaded a nipple 14, and the latter in the illustrated use of the swivel joint is connected to one of the pipe section elbows 15. Body section 17 is screwed into the outer threaded end of counterbore 19 in section 18, as at 20, the joint being taken up so that the end of section 18 is brought against annular shoulder 21 on section 17. When the joint is taken up, the body sections may be locked together by screw 22. The inner end of body section 17 presents an annular bearing shoulder 23 which faces an opposing bearing shoulder on the swivel pipe section 13 of the joint, as will now be described.

The swivel pipe section 13 is provided at a suitable distance from its inner end, with an annular flange 24 which preferably, though not necessarily, is integral with the pipe. As previously stated, the outer threaded end 13a of pipe 13 is adapted to be connected with an elbow 15 of one of the hose pipe sections. One end of flange 24 provides an annular bearing shoulder 25 facing the body shoulder 23, and between these shoulders is confined a suitable thrust bearing assembly, generally indicated at 26, and shown typically as a roller or ball type bearing. The latter comprises a pair of case hardened race rings 27 having grooved surfaces in which balls 28 ride. This type of bearing is particularly suitable in that friction between the relatively rotating parts is minimized, and also because of the wear resisting character of the bearing due to the provision of case hardened race rings.

The inner end of body section 18 has a packing receiving bore 30, and between bore 30 and counterbore 19 is formed an annular beveled shoulder 31. The end of the flange 24 projects within bore 30, and the exterior of the flange is shaped in conformity with the inner wall of the body at the beveled shoulder 31, as indicated. A slight amount of clearance may be allowed at 32 between flange 24 and the body, in order to insure free relative turning of the parts. Shoulder 31 serves primarily as a stop to prevent relative longitudinal movement of pipe section 13 with the body in such direction as to move flange 24 away from the bearing, although an additional object is gained by the provision of a beveled shoulder, for reasons that will hereinafter appear.

Preferably a small amount of clearance is allowed at 33 between body section 17 and pipe 13, in order that the clearance space may be filled with grease to prevent access of abrasive particles or mud to the bearing. For the purpose of lubricating the bearing 26 and maintaining the bearing space filled with grease, I show a threaded opening 35 in the wall of the body, into which a check valve 35a, adapted to connect with a pressure lubricant supplying device (not shown) may be threaded. Grease may be forced into the bearing in such quantity as to fill the latter, and also the clearance space 33.

On the inner end portion of pipe 14 adjacent flange 24 is carried a cup shaped gasket 36, the inner lip portion 36a of which is clamped in engagement with a flange 24 by washer 37 and lock nut 38 threaded on the pipe. The outer lip portion 36b of the gasket is adapted to be expanded by fluid pressure into fluid tight engagement with the wall of body bore 30. An annular space 39 is provided between lip 36b of the gasket and nut 38 in order to permit the pressure of the fluid or lubricant within the joint to effectively act against substantially the full length of the gasket lip. Preferably the end 40 of the gasket will be beveled to increase the effective pressure surface thereon. The gasket may be made of any suitable flexible material, typically and preferably of leather or high grade rubber.

In accordance with the present invention, I provide means whereby the gasket is maintained in constant fluid tight engagement with the body, and independent of the fluid pressure in the line. This is accomplished preferably by maintaining a pressure of lubricant against the inner face of the gasket lip sufficient to expand it tightly outward against the body.

A metallic pressure ring 41 is inserted within body bore 30 and surrounding pipes 13 and 14, the ring preferably having a sliding fit with the bore wall and the outer surface of the pipes. Leakage of lubricant from space 42 past the pressure ring is prevented by means of a flat gasket 43 carried with the pressure ring. The described ring and gasket assembly is pressed toward the cup shaped gasket 36 by means of a coil spring 44 inserted between body shoulder 45 and ring 41. Lubricant may be supplied by a grease "gun" to space 42 through a threaded bore 46, in which a valve plug 48 is inserted, the valve plug serving to prevent escape of lubricant once put into space 42. As lubricant, for example heavy cup grease, is forced under pressure into space 42, gasket 43 and the pressure ring will be forced away from the cup gasket, compressing spring 44. Space 42 may be so filled with lubricant until the pressure ring is displaced to a limiting position as permitted by the compression of the spring. A constant pressure is exerted by the pressure ring, due to the thrust of spring 44 on the lubricant in space 42, tending to expand the cup gasket lip 36b into fluid tight engagement with the body. Due to the fact that the lubricant is prevented from escaping past gasket 36, and since no substantial amount of leakage will occur past gasket 43 and the pressure ring, after space 42 has been filled with lubricant, the latter, by the pressure of spring 44, will maintain the cup gasket expanded over long periods of time and without the necessity for frequent replacement of the lubricant.

By keeping the lubricant in space 42 in contact with the gasket 36, the latter is kept in freely flexible or pliable condition, to obvious advantage in maintaining such tight engagement with the body as to provide a fluid tight joint. Washer 43 may also be of leather or other suitable pliable material, and the lubricant in space 42 will likewise serve to keep washer 43 in good pliable condition and in close fluid tight engagement with the swivel pipe and body. It will be noted that should any of the lubricant in space 42 leak past the washer gasket, such leakage will then flow into the space occupied by the thrust bearing, and into clearance space 33, to the end that access of abrasive or dirt particles into the thrust bearing will be effectively prevented.

As previously explained, the annular shoulder 31 between packing receiving bore 30 and counterbore 19 is beveled toward the former. This affords great convenience in inserting gasket 36 within bore 30 in the operation of assembling the joint, due to the fact that upon engagement with the gasket as the later is thrust into bore 30, shoulder 31 has a tendency to constrict the lip portion 36b of the gasket to an extent such as to permit it to slip freely into the bore. The advantage of providing a tapered, instead of a square shoulder at 31 will be readily seen in that should the shoulder be cut square, it would have a tendency to obstruct the passage of the gasket into bore 30 in the event the lip portion 36 normally were expanded to a diameter greater than that of the packing receiving bore.

As stated in the earlier part of the description difficulty is commonly encountered in the use of rotary hose, due to the destructive wearing action of abrasive or dirt particles in the circulating mud, on the conduit of which the hose is made up. The circulating mud usually is pumped through the hose under high pressure and at such velocity that the abrasive particles eventually wear away the inner wall surface of the hose conduit to the point at which the hose will fail under the pressure.

In accordance with the invention, this difficulty is overcome by the provision of a removable wear taking liner within the rotary hose proper, and the latter thus becomes an outside pressure resisting casing for the liner. After one liner has become worn to the point at which the casing would be subjected to the abrasive action of the mud, the worn liner may be replaced. It will be understood that while for purposes of describing the invention I show one particular type of metallic pipe rotary hose in combination with a removable wear taking liner, the invention broadly contemplates the provision of such liners in any of the usual types of rotary hose. For example, flexible rotary hose may be provided with such liners as well as rigid section pipe hose of the character shown.

In Fig. 2, I show a flexible tubular liner 50 extending continuously through the swivel joint, the liner of course continuing through the swively connected sections 11 and 12 of the hose. It may be mentioned that a liner comprising a single piece may extend continuously through the entire hose, or the liner may be made up of jointed sections connected together at suitable points in the hose. As previously stated, pipes 13 and 14 of the swivel joint, and pipe sections 11 and 12 of the hose may be regarded as outer pressure resisting casings of sufficient strength to hold the pressure of the circulating fluid being pumped. Preferably the liner 50 will have less pressure resisting characteristics, that is it may in itself be incapable of carrying the circulating fluid pressure, since the primary function of the liner is to take the wear in the hose caused by the abrasive action of the circulating fluid, rather than to withstand high pressure.

The liner preferably will be made of suitable flexible material, and material of such flexibility as to permit, as the occasion arises, a certain amount of twisting strain at the swivel joint. Liners of fabric or fabric and rubber composition may be so formed as to have the desired characteristics of flexibility suitable for the present purposes. I may also state that in view of the fact that the outside pressure resisting casing is fluid tight, the liner may or may not be impervious to the circulating fluid.

As stated, the liner preferably is made of such material as to be capable of a certain amount of twisting without becoming ruptured, this being desirable in order that relative turning between pipes 13 and 14 of the swivel joint may take place without shearing the liner. In pipe rotary hose of the character shown, the travel of the hose during up or down movement of the drill pipe ordinarily is such that the sections 11 and 12 of the hose are not swung relatively an angular distance exceeding say 180°, and ordinarily at no time will one of the sections swing completely around relative to the other. Thus in the swivel joint, pipes 13 and 14 will not ordinarily have relative rotation exceeding around 180°. By forming a liner of flexible material having the characteristics described, and due to the limited relative rotation of the joined sections, the liner will not be caused to shear or rupture at the point at which the liner bridges the space at 52 between the ends of pipes 13 and 14. The liner may be made of sufficient strength or toughness that relative turning of pipes 13 and 14 beyond a certain degree will cause slippage between the liner and the pipes adjacent their inner ends, to relieve the liner from torsional stress.

of the joined sections, which might result in severing the liner by excess wear and cutting action between the ends of the pipes, I provide means whereby support may be given the liner against expansion into space 52. This may be accomplished by filling space 53 at the side of the pressure ring opposite space 42, with lubricant under pressure so as to provide backing for the outer surface of the liner extending across space 52. Lubricant may be introduced to space 53 by way of a normally plugged, screw threaded opening 54 in section 18 of the body.

I claim:

1. In a pressure fluid conduit, the combination comprising, a pair of outside pressure resisting metal pipe lengths, a swivel joint connecting said pipes and permitting relative rotation between the pipes, and the swively connected ends of said pipes being spaced apart, said joint comprising a body surrounding said spaced ends of the pipes, a removable flexible liner within said pipes and extending continuously through said swivel joint, and means within said body providing support for the outside of said liner at the said space between the swively connected ends of said pipes.

2. In a pressure fluid conduit, the combination comprising, a pair of outside pressure resisting metal pipe lengths, a swivel joint connecting said pipes and permitting relative rotation between the pipes, and the swively connected ends of said pipes being spaced apart, said joint comprising a body surrounding said spaced ends of the pipe, a removable flexible liner within said pipes and extending continuously through said swivel joint, and means within said body for maintaining confined lubricant in contact with the outside of said liner at the said space between the swively connected ends of said pipes to provide outside support for the liner at said space.

3. In a pressure fluid conduit, the combination comprising, a pair of outside pressure resisting metal pipe lengths, a swivel joint connecting said pipes and permitting relative rotation between the pipes, and the swively connected ends of said pipes being spaced apart, said joint comprising a body surrounding said spaced ends of the pipes, a removable flexible liner within said pipes and extending continuously through said swivel joint, packing means between said body and the outside of one of said pipes, and means for applying lubricant under pressure to said packing means.

4. In a pressure fluid conduit, the combination comprising, a pair of outside pressure resisting metal pipe lengths, a swivel joint connecting said pipes and permitting relative rotation between the pipes, and the swively connected ends of said pipes being spaced apart, said joint comprising a body surrounding said spaced ends of the pipes, a removable flexible liner within said pipes and extending continuously through said swivel joint, packing means between said body and the outside of one of said pipes, and means for exerting a continuous pressure of lubricant against said packing means.

5. A swivel pipe joint comprising, a tubular body having a packing receiving bore, a pipe connected to said body, a relatively rotatable pipe within said bore, packing within said bore and engaging the last mentioned pipe, said packing being adapted to prevent fluid leakage between the body and said relatively rotatable pipe, means for inliner within said pipes and extending continuously through the swivel joint.

6. A swivel pipe joint comprising, a tubular body having a packing receiving bore, a pipe connected to said body, a relatively rotatable pipe within said bore, packing within said bore and engaging the last mentioned pipe, said packing being adapted to prevent fluid leakage between the body and said relatively rotatable pipe, means for introducing lubricant to said bore, means in said bore for exerting a continuous pressure of lubricant against said gasket, and a flexible liner within said pipes and extending continuously through the swivel joint.

7. In a pressure fluid conduit, the combination comprising, a pair of outside pressure resisting metal pipe lengths, a swivel joint connecting said pipes and permitting relative rotation between the pipes, a body surrounding the ends of the pipes, and a removable flexible liner within said pipes and extending continuously through said swivel joint.

8. A swivel joint comprising, a tubular body having an interior annular bearing shoulder, a relatively rotatable pipe within said body and having an annular flange, one end of which provides a bearing shoulder facing the first mentioned shoulder, a bearing between the body and the opposite end of said flange, an annular gasket carried on said pipe, said gasket being expansible into fluid tight engagement with said body by fluid pressure, and means for exerting a continuous pressure of lubricant against said gasket.

9. A swivel pipe joint comprising, a tubular body having an interior bearing shoulder, a relatively rotatable pipe within said body and having an outside annular flange, one end of which forms a bearing shoulder facing said first mentioned body shoulder, ball bearings between said body and the opposite end of said flange, fluid pressure actuated packing means between the interior of said body and the outside of the pipe, and spring actuated means for maintaining a continuous pressure of lubricant against said packing means.

10. A swivel pipe joint comprising, a tubular body having a packing receiving bore, a relatively rotatable pipe within said bore, an annular flange on said pipe, an annular cup-shaped gasket carried on said pipe, said gasket having an outer lip expansible by fluid pressure into engagement with the wall of said bore, a nut threaded on said pipe and compressing the inner lip of said gasket against said flange, a bearing shoulder at one end of said flange engaging an interior shoulder on said body, a bearing placed between the body and the opposite end of said flange, a pressure ring in said bore beyond the end of said outer lip of the gasket, means for admitting lubricant to said bore between said gasket and the pressure ring, and a spring within said bore and bearing against said ring to press it toward said gasket.

JAMES J. SANTIAGO.